United States Patent [19]

Bier

[11] Patent Number: 4,933,603
[45] Date of Patent: Jun. 12, 1990

[54] CIRCUIT ARRANGEMENT FOR INDICATOR LIGHTS IN MOTOR VEHICLES

[75] Inventor: Axel Bier, Gundelsheim, Fed. Rep. of Germany

[73] Assignee: Audi AG, Neckarsulm, Fed. Rep. of Germany

[21] Appl. No.: 265,684

[22] Filed: Nov. 1, 1988

[51] Int. Cl.$^5$ ............................................. B60Q 3/00
[52] U.S. Cl. .................................... 315/77; 315/178; 315/201; 315/294; 315/312
[58] Field of Search .................. 315/77, 178, 201, 294, 315/312

[56] References Cited

U.S. PATENT DOCUMENTS

| | | | |
|---|---|---|---|
| 3,371,241 | 2/1968 | Amacher | 215/294 |
| 3,704,379 | 11/1972 | Slehofer | 315/77 X |
| 4,029,991 | 6/1977 | Schultz | 315/77 X |
| 4,358,713 | 11/1982 | Senoo et al. | 315/77 X |

*Primary Examiner*—Eugene R. Laroche
*Assistant Examiner*—Do Hyun Yoo

*Attorney, Agent, or Firm*—Kane, Dalsimer, Sullivan, Kurucz, Levy, Eisele and Richard

[57] ABSTRACT

A circuit arrangement for indicator lights in motor vehicles comprises four differently dimmable groups of lights I for tachometer and speedometer illumination 1, 2, II for the remaining dashboard illumination 3, 4, III for the center panel and foot space illumination 5, 6, and IV for the illuminating lights 7, 8 in a radio unit. These lights can be connected to a voltage source via a potentiometer 9 and an electronic amplifier 12. The amplifier has a number of different characteristic curves, corresponding to the number of groups of lights. The shape of these curves is such that, when the potentiometer 9 is turned from its null position into its end position, at first only the voltage for the first group of lights I, that is for the speedometer and tachometer illumination 1 and 2, is increased from zero to a average value. The remaining groups are switched on sequentially. In this way, the brightness of the separate groups of lights can be adjusted individually, with priority for the brightness of the tachometer and speedometer illumination.

3 Claims, 3 Drawing Sheets

CIRCUIT ARRANGEMENT FOR INDICATOR LIGHTS IN MOTOR VEHICLES

The invention is directed to a circuit arrangement for indicator lights in motor vehicles corresponding to the introductory part of claim 1.

A known circuit arrangement of this type has two groups of light sources. The first of these illuminates the instrument cluster, and the second one illuminates instruments or other parts, which are mounted in a central panel, such as the radio or ash tray. Their brightness can be changed by turning a single potentiometer, so as to follow a characteristic curve that is stored in a processor unit or that is simulated by appropriate circuitry. When the potentiometer of the known circuit arrangement is turned from its null position to its end position, the voltage for the second group is increased continuously from zero to its maximum value, while the voltage for the first group is increased faster than the voltage for the second group by an angle of rotation of about 60°, and is then gradually increased further up to its maximum. This way of jointly controlling the brightness of the two groups of light sources is not fully satisfactory, since changing the brightness of the two groups of light sources simultaneously does not afford the driver the opportunity of optimally controlling the brightness of instruments, which are important to him, without simultaneously adjusting the illumination brightness of the other instruments to sometimes troublesome values.

It is an object of the invention to provide a circuit arrangement, by means of which the driver can match the instrument illumination individually to his requirements.

Pursuant to the invention, this objective is accomplished by the features that are specified in the characteristic part of claim 1.

The inventive circuit arrangement gives priority to controlling the illumination brightness for the speedometer and optionally the tachometer, since these instruments represent the most important sources of information for the driver. During the first rotation range of the potentiometer from its null position, only these instruments are illuminated. Only after the potentiometer continues to be turned, is the remaining dashboard illumination gradually switched on. The brightness of the third group can now be changed between zero and a maximum value, at first without a change in the brightness of the first and second illumination groups. In the final segment of the angular range of the potentiometer, the voltage for the third group is then kept at the maximum, while the voltages for the first and second group are raised continuously to their maximum values at the end position of the potentiometer.

The average value of the voltages for the first and the second group should constitute about 40% of the maximum voltage. Under normal circumstances, this voltage provides adequate brightness for the tachometer and speedometer and for the remaining dashboard illumination.

The inventive circuit arrangement may also have a fourth group of light sources for radio illumination and the like. When the potentiometer is turned from its null position to its end position, the voltage of this group is at first kept at a constant low value over a substantial range. Subsequently, it is increased to its maximum value, essentially together with the voltage for the third group.

Naturally, it is assumed in every case that the main light switch of the motor vehicle is switched on.

A form of construction of the invention is described in the following with reference to the drawings.

Figure 1:
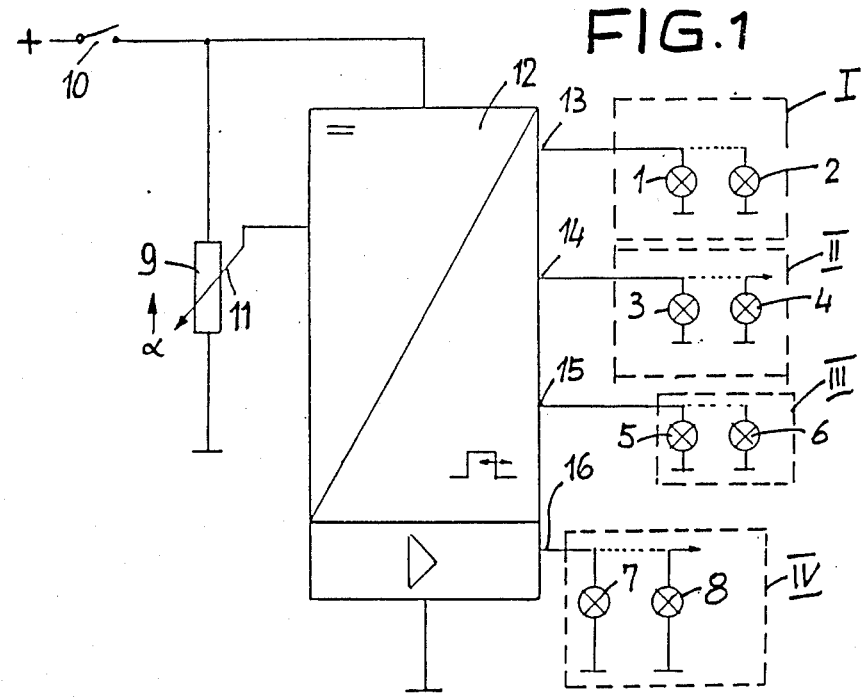
FIG. 1 shows a schematic block circuit diagram of an inventive circuit arrangement.

Reference is first made to FIG. 1, which shows a basic circuit arrangement for differently dimmable groups of lights I, II, III, IV.

Group I comprises lights 1 and 2 for the tachometer and speedometer illumination. Group II comprises the remaining lights 3 and 4 for illuminating the instruments of an instrument cluster and, as necessary, other lights (not shown) for illuminating the gearshift indicator, etc. The lights of Groups I and II are normally disposed in an instrument cluster. Group III comprises lights 5 and 6 to illuminate instruments and/or functional elements (switch, ash tray, etc). in the center panel of the vehicle as well as the lights in the forward passenger foot space. Finally Group IV comprises illumination lights 7 and 8 in the radio unit.

Figure 2:
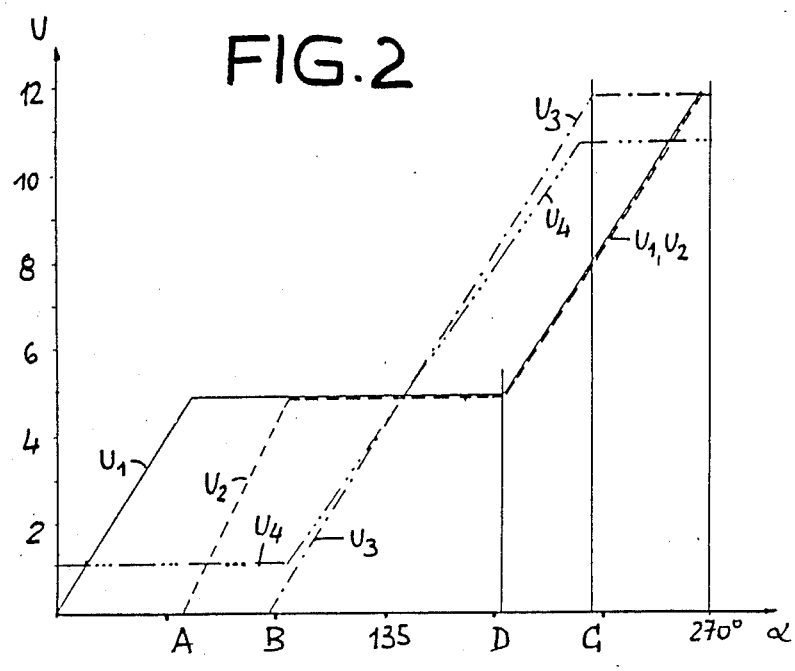
FIG. 2 shows a diagram of the characteristic curves of the individual groups of lights.

The brightness of lights of Groups I, II, III, IV is to be changed according to a prescribed characteristic curve by means of a single potentiometer 9 with a knurled wheel. The potentiometer 9 has an adjustment angle of, for example $\alpha = 270°$ C. It is connected between plus (after the main light switch 10) and minus, and its tap 11 is connected to a control unit 12, in which output voltages for the four groups of lights I–IV are generated in accord with a prescribed characteristic curve. The control unit 12 has four outputs 13, 14, 15, and 16. These are connected to the lights of the individual Groups I–IV in the manner shown. The control unit 12 is likewise connected on the one hand to the plus line after the main light switch 10 and to minus (ground). The characteristic curves stored in the control unit 12 are shown in FIG. 2. Here the voltages $U_{1-4}$ are plotted as a function of the angle of rotation $\alpha$ of the knurled wheel of the potentiometer 9, the end position of which is reached after a rotation of 270° C. In this end position, the slider tap 11 of the potentiometer 9 is connected directly to the battery voltage. Thus the full voltage of the vehicle electrical system is applied via the control unit 12 to the lights of the four groups.

FIG. 2 shows the characteristic curve of the voltage $U_1$ for Group I by means of a solid line, the characteristic curve of voltage $U_2$ for Group II by means of a dashed line, the voltage $U_3$ for Group III by means of dots and dashes, and the characteristic curve of voltage $U_4$ for Group IV by means of dots and dashes with three dots. When the knurled wheel of the potentiometer is turned from the null position, voltage is at first applied only to the lights 1, 2 of Group I. As the knurled wheel is turned by about 50° C., this voltage rises continuously up to a medium value of, for example, 5 V. The lights of Group IV are already at a low voltage of, for example, 1 V as soon as the main light switch 10 is closed FIG. 1, while the lights of Groups II and III are switched off. After the knurled wheel is turned by about 50° C. (Point A), a voltage $U_2$ is applied to the lights of Group II. Up to an angle of rotation of about 90° C. (Point B), this voltage rises continuously to the level at which the voltage for the lights of Group I was held constant. After the angle of rotation of about 90° C. (Point B) is reached and the knurled wheel is turned further, a voltage $U_3$ is applied to the lights of Group III. During the subsequent further rotation up to Point C, which is at an angle of rotation of about 220° C., this voltage $U_3$ is increased continuously from zero to a maximum value. The output voltages $U_1$ and $U_2$ for the lights of Groups I and II are kept constant at their medium value of about 5 V up to a Point D, which is at an angle of rotation of approximately 185° C. As the potentiometer is turned further, these voltages are jointly and continuously increased up to their maximum. The voltage $U_4$ for the lights of Group IV is kept at the constant low value of about 1 V up to approximately Point B. This voltage is then increased essentially with the voltage $U_3$ for the lights of Group III until it reaches a maximum, which in this case is somewhat lower than the battery voltage or the voltage of the electrical system of the vehicle.

The characteristic curve patterns shown here enable the user to adjust the brightness of individual groups of lights essentially individually by means of a single potentiometer, the illumination for the tachometer and speedometer (lights 1, 2) being given priority. Only if the knurled wheel is turned further and after the remaining lights 3, 4 of the instrument cluster are switched on, is current supplied to the lights 5, 6 of Group III. The voltage $U_3$ for the lights of this group can now be adjusted continuously between zero and a high value close to the maximum, without changing the brightness of the lights of Groups I and II. The brightness of the illumination for the radio unit is increased in a meaningful manner in parallel with the brightness of the lights in Group III, since the radio unit normally is mounted in the center panel and thus all lights, which are situated in the area of the center panel, will be about equally bright.

Figure 3:
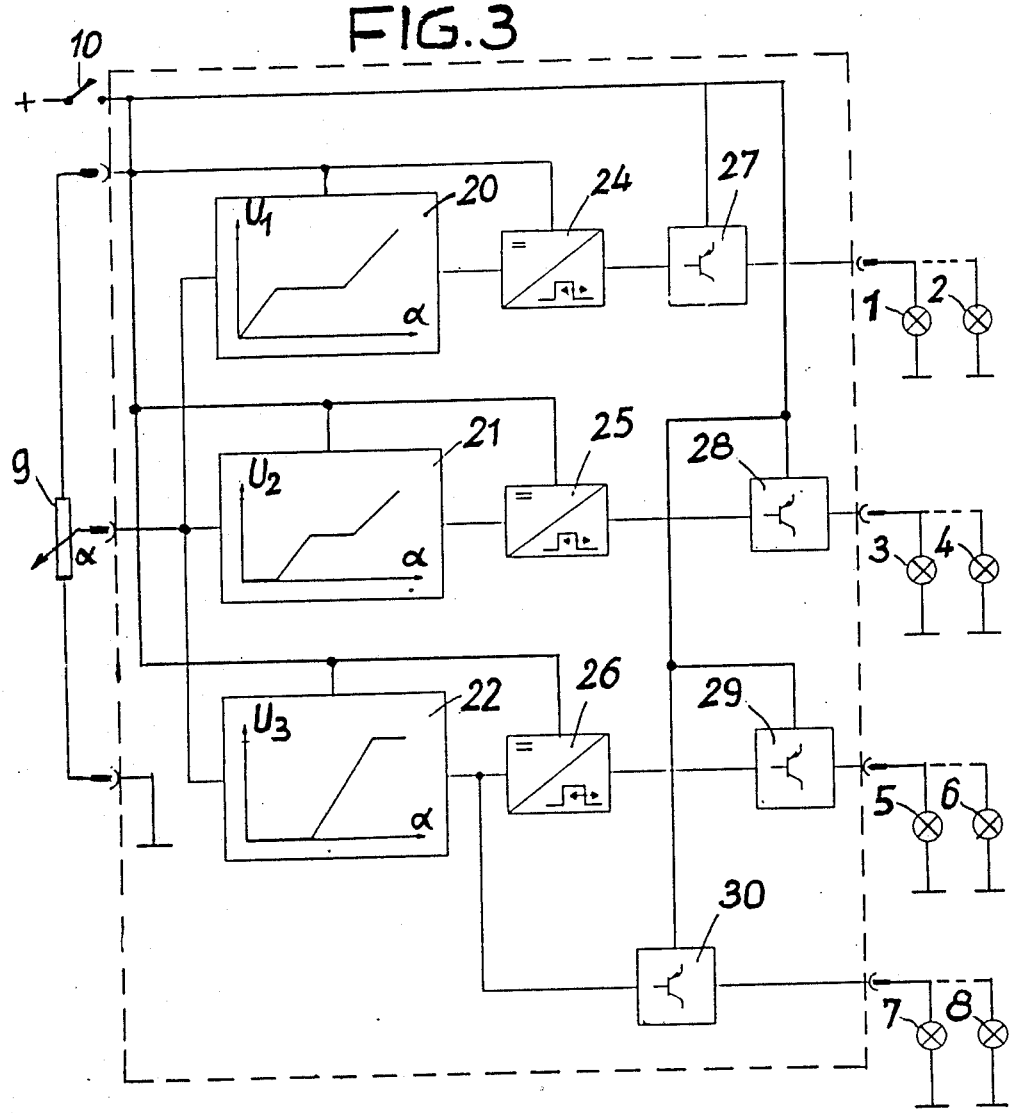
FIG. 3 shows the circuit arrangement of FIG. 1 in an analog circuit technique in block diagram representation.
Figure 5:
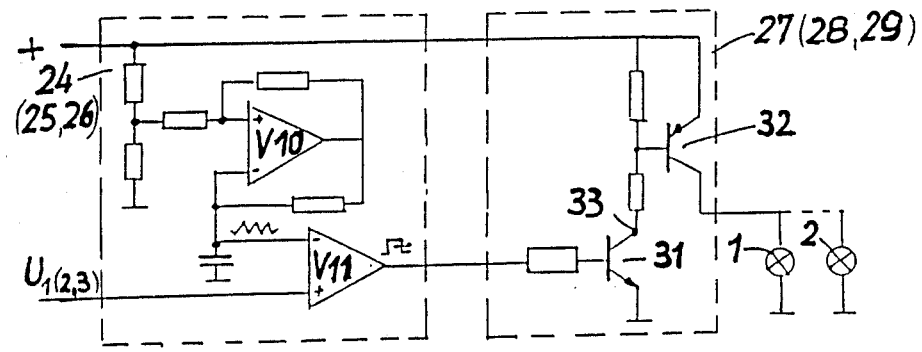
FIG. 5 shows a block circuit diagram of the unit, used in the circuit arrangement of FIG. 3, for pulse-width-modulated activation of a power output stage to supply pulsed voltage to a group of lights.
Figure 4:
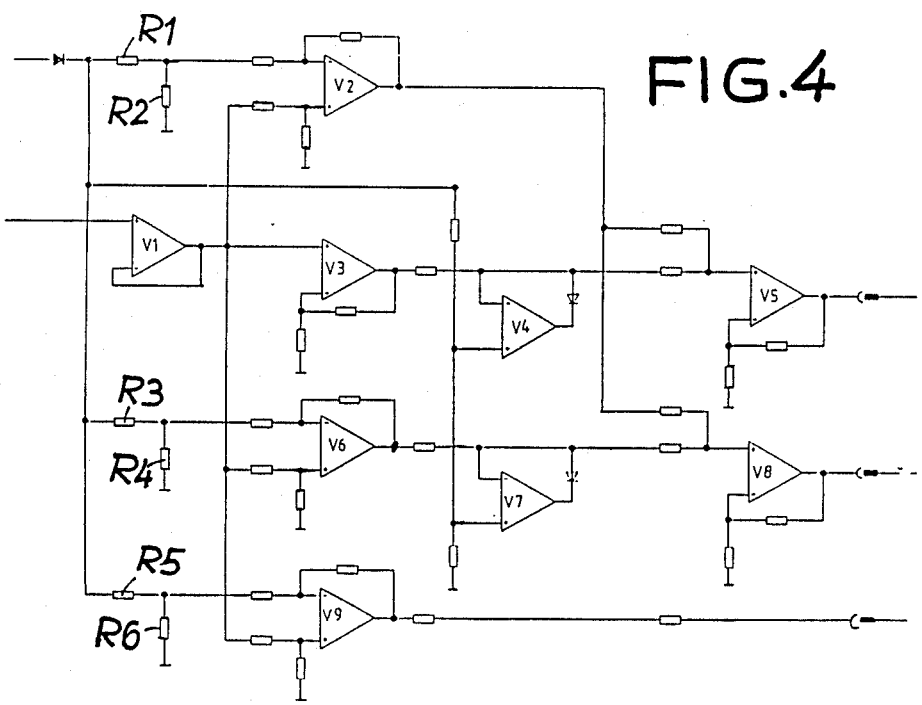
FIG. 4 shows a circuit diagram of the control unit for the characteristic curves, which is used in the circuit arrangement of FIG. 3.

The circuit contained in the control unit 12 can be designed in analog or digital circuit technology. FIGS. 3 to 5 show circuit diagrams for the analog circuit technology. In contrast to the diagram of FIG. 2, the starting point here is that the voltage $U_4$ for the lights 7, 8 of Group IV is changed simultaneously with the voltage $U_3$ for the lights of Group III.

For each of the three groups of lights I, II, and III, a characteristic curve control unit 20, 21, and 22 is provided, which in each case is followed by a pulse width modulation stage 24, 25, 26 and a final stage 27, 28, and 29. Depending on the setting of the angle of rotation of the knurled wheel of the potentiometer 9, an appropriate voltage $U_1$, $U_2$, or $U_3$ is applied by these units to the modulation stages 24 to 26. These voltages correspond to the characteristic curves shown in FIG. 2 and stored in the control units 20 to 22. The modulation stages 24 to 26 always deliver a pulse width modulated control signal to the final stages 27 to 29, in which a pulse width modulated output voltage for activating the lights 1 to 6 is generated. Only a final step 30, but no pulse width modulation stage is provided for lights 7 and 8. The reason for this is that a linear voltage is preferred for the illuminating lights 7 and 8 in the radio unit, in order to avoid interference with the operation of the radio.

FIG. 4 shows the circuit for the analog characteristic curve control units 20, 21, and 22 of FIG. 3. The input voltage is conducted from the tap 11 of the potentiometer 9, via an amplifier V1, to four amplifiers V2, V3, V6, and V7. The amplifier V2 acts as a difference amplifier. Due to the resistance divider ratio of R1 to R2, this amplifier commences to become operational only at an angle of rotation of the knurled wheel of about 185° C. (Point D in FIG. 2). The voltage U1 is generated by the amplifier V3 up to an angle of rotation A. It is conducted to the modulation stage 27 via a following summation amplifier V5, which initially does not affect the magnitude of the voltage U1. A limiting amplifier v4 is connected in parallel with the connection between V3 and V5. When the knurled wheel of the potentiometer 9 is turned from A to D, this amplifier limits the voltage to the desired medium value, for example, 5 V. The difference amplifier V2 is operational from point D up to the final stop of the knurled wheel and its voltage is added in the summation amplifier V5 to the voltage that remains constant within this angular range. Consequently, the characteristic curve shown in FIG. 2 and drawn into the control unit 20 is obtained for the output voltage U1.

The characteristic curve for U2, that is, for lights 3 and 4, is formed by the difference amplifier V6 amplifying the output voltage of V1 on the basis of the resistance divider ratio of R3 to R4 beginning at position A of the knurled wheel, that is at an angle of rotation of the knurled wheel of about 50° C. whereby the output voltage of V1 rises continuously to the medium valve of $U_1$ approximately up to the angular position B. Its output voltage is limited to the constant value of about 5 V by a limiting amplifier V7, until the knurled wheel has reached point D. From there on, the summation amplifier V8 receives the additional voltage from the difference amplifier V2, so that the characteristic curve for U2 has the shape shown in FIG. 2.

The characteristic curve of the third voltage U3 for the lights 5 and 6 is formed by a difference amplifier V9. This amplifier becomes operational only at point B, due to the resistance divider ratio of R5 to R6. It then increases the voltage U3 linearly up to point C, from the value zero (at point B) to the maximum value. The beginning and the Point of inflection of each characteristic curve can be arbitrarily set by properly choosing the resistance divider ratio of R1 to R2, R3 to R4, and R5 to R6. By choosing the amplification factors of the difference amplifiers and of the summation amplifiers, the slope of the characteristic curves can additionally be set to any desired value.

FIG. 5 shows the pulse width modulation stage 24, 25, and 26, and the following final stage 27 and 28 or 29 according to FIG. 3. V1O is a square-wave generator, from inverting the input of which a saw-tooth voltage is tapped, which is applied to the inverting input of the amplifier V11. This amplifier compares the saw-tooth voltage with the input voltage U1 and U2 or U3 of the characteristic curve control unit of FIG. 4. Depending on the comparison, a pulse width modulated control signal for the final stage 27 and 28 or 29 is generated at the output of the amplifier V11. With this, an NPN transistor 31 is energized in the final stage 27 and 28 or 29. This transistor 31 drives the base of a PNP power transistor 32 and thus generates the pulse width modulated output voltage for energizing the lights 1, 2 and 3, 4 or 5, 6. The final stage 30 for the lights 7 and 8 corresponds to the final stage shown in FIG. 5.

To energize those lights, which have one side connected directly to the battery voltage, the final stage is constructed only with an NPN power transistor, the lights being connected to ground via terminal 33 (the collector of the transistor) in the cycle of the pulse width modulated control signal, and are thus energized in a pulse width modulated fashion.

Figure 6:
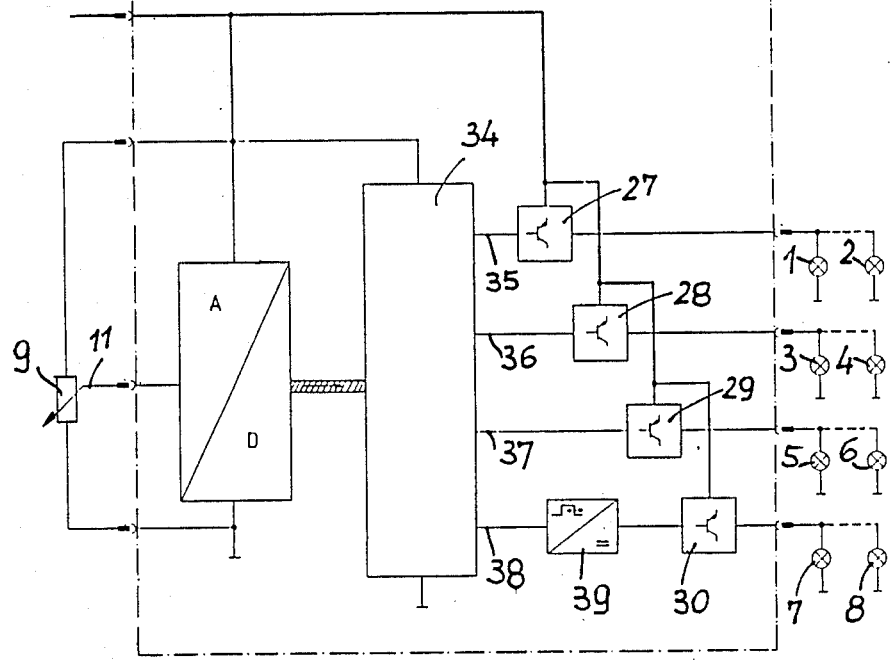
FIG. 6 shows the circuit arrangement of FIG. 1 in an MCU design.

Reference is now made to FIG. 6, which shows a circuit for a dimming amplifier in MCU design. Here the voltage tapped from the potentiometer 9, this voltage being a function of the adjustment angle, is converted into a digital value by means of an A/D converter. This digital value is conducted to the MCU unit 34, which comprises a ROM, a timer, and an I/O unit. The three characteristic curves U1, U2, and U3 are stored in the ROM. The MCU unit 34 has four outputs 35, 36, 37, and 38, at which a pulse width modulated voltage is outputted for the final stages 27, 28, and 29, which correspond to the final stage shown in FIG. 5. To drive the final stage 30 for lights 7 and 8, the pulse width modulated voltage at output 38 is linearized by an electric system value 39.

I claim:

1. A circuit arrangement for indicator lights in motor vehicles with several differently dimmable groups of lights, which can be connected to a voltage source via a potentiometer and an electronic amplifier, which contains a number of different characteristic curves corresponding to the number of groups of lights, wherein at least three groups of lights (I to IV) are provided, of which the first comprises the speedometer and possibly the tachometer illumination (1, 2), the second comprises the remaining dashboard illumination (3, 4), and the third comprises a center panel and possibly foot space illumination (5, 6), and wherein the shape of the characteristic curves ($U_1$, $U_2$, $U_3$) for the voltage of these groups is such that, when the potentiometer 9 is turned from its null position to its end position, at first only the voltage for the first group (I) is increased from zero or from a minimum value to an average value, then the voltage for the second group (II) is increased from zero or a minimal value to the average value of the first group (I), and thereupon the voltage for the third group (III) is increased from zero or from a minimum value, while the voltages for the first and second group are held at a constant average value, and finally the voltages for the first and second group are increased together to a maximum value.

2. The circuit arrangement of claim 1, wherein the average value of the voltages for the first and second group, which is kept constant, amounts to about 40% of the maximum voltage.

3. The circuit arrangement claim 1, wherein a fourth group of lights (IV) is provided for radio illumination, etc., the voltage of which follows a pattern, when the potentiometer (9) is turned from its null position to its end position, such that at first the voltage is held at a constant low value over a significant range and then is increased up to a maximum, essentially together with the voltage for the third group (III).

* * * * *